May 26, 1964     A. M. MAIMIN     3,134,481
CONVEYOR
Filed Nov. 30, 1962     2 Sheets-Sheet 1
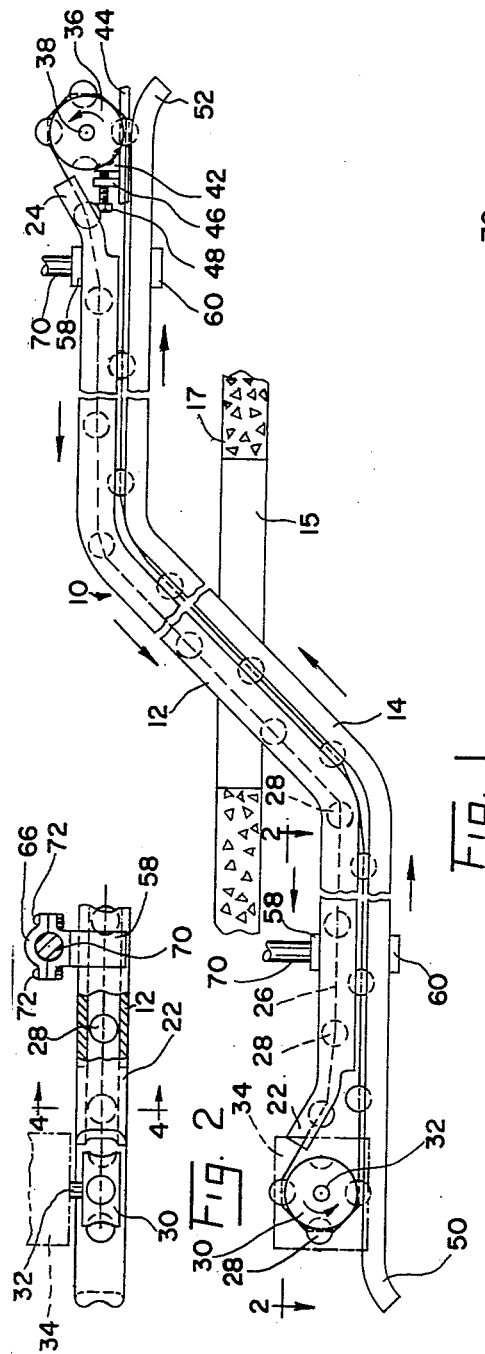
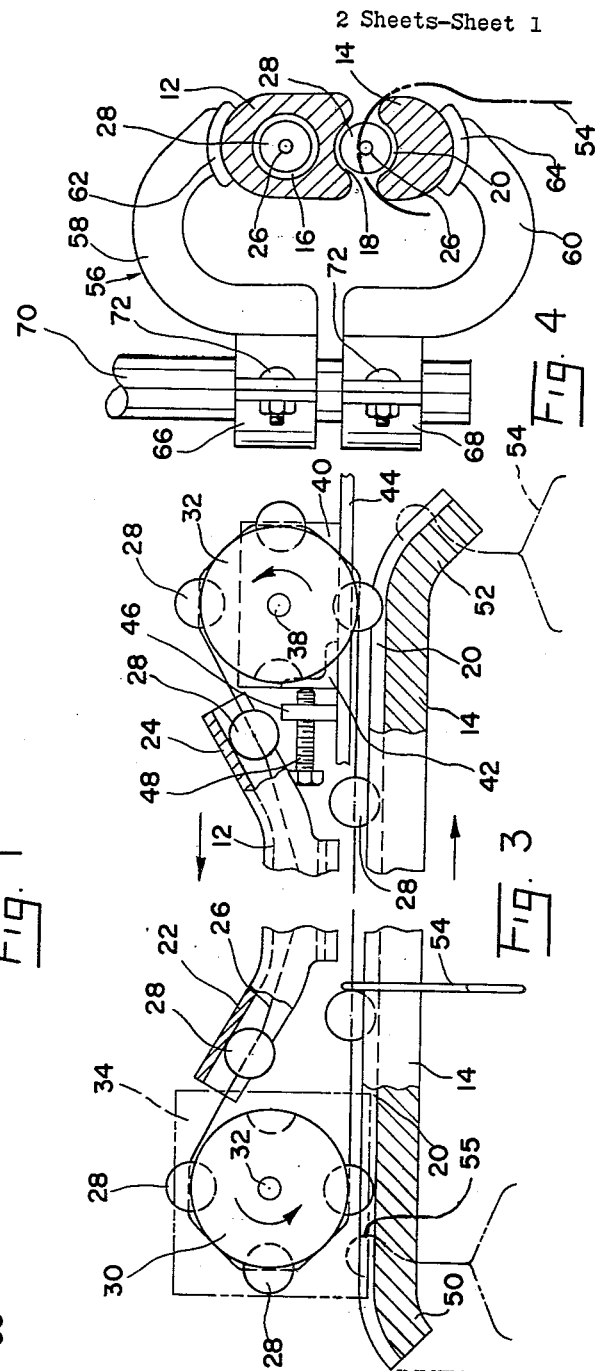
INVENTOR.
AARON M. MAIMIN
BY
ATTORNEY

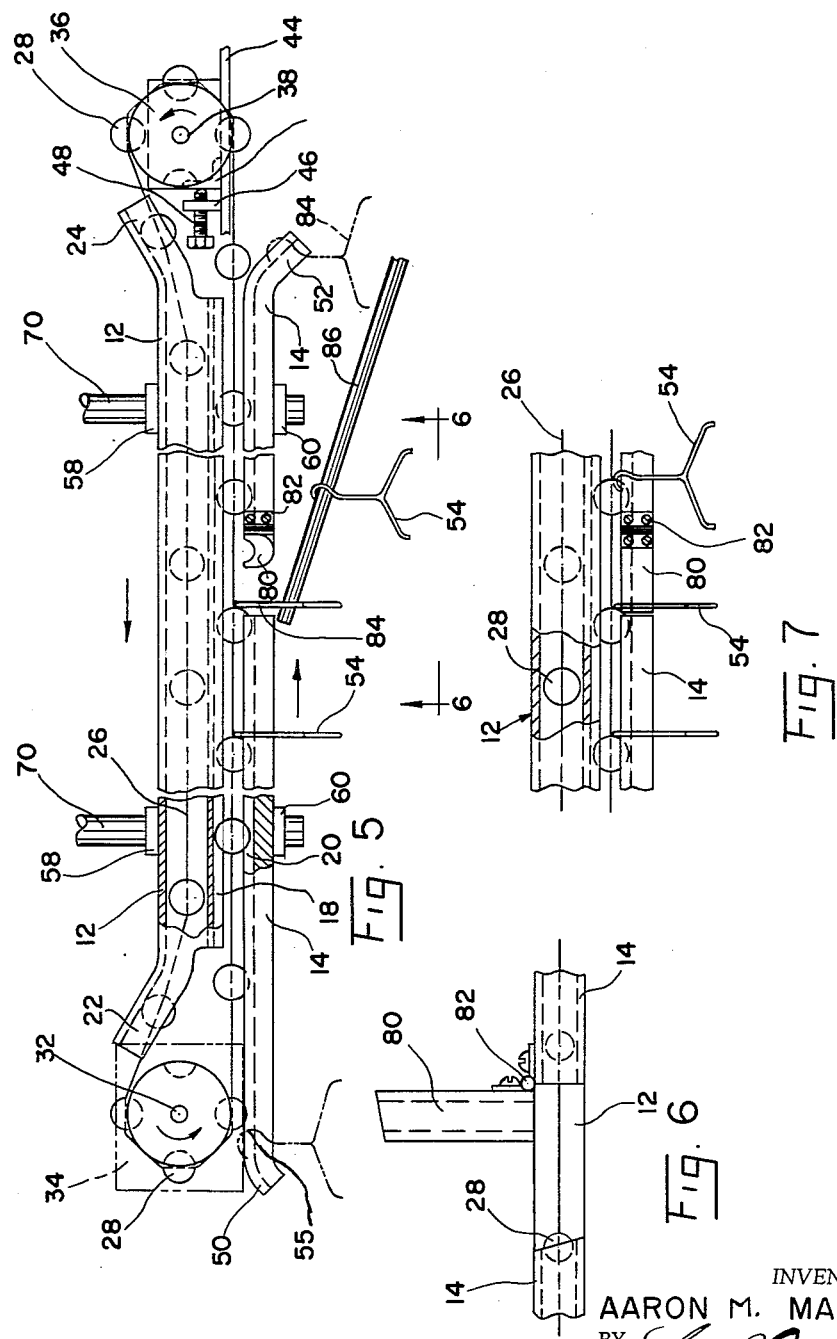

United States Patent Office 3,134,481
Patented May 26, 1964

3,134,481
CONVEYOR
Aaron M. Maimin, Philadelphia, Pa., assignor to Conveyor Corporation of America, Philadelphia, Pa., a corporation of Pennsylvania
Filed Nov. 30, 1962, Ser. No. 241,246
3 Claims. (Cl. 198—168)

This invention relates to a conveyor especially adapted for transferring objects in any desired direction in one plane, and in any desired direction in more than one plane.

In various manufacturing processes, the articles manufactured are made by various steps which are carried out at various locations on the same, or on different floors, of a building, and the articles must be transferred from one location to another, either to complete the processes or to dispose of the finished articles. For example, in the clothing industry, the material is basted in one place; it is lined in another; it is sewed in another; and it is provided with buttonholes in another, etc. Some of these operations are performed on upper or lower floors, or in different sections of the same floor. The conveyor forming the subject of this disclosure has been designed for use in an operation of the type exemplified, but it is obvious that, with or without slight modifications, the present conveyor can be adapted for other applications.

A conveyor of the type referred to should operate with minimum friction and noise, to save wear and tear on the machinery and to protect the attendants from the ill effects of continuous jarring noises.

The object of the present invention is to produce an improved conveyor which will possess all of the advantages set forth.

The full nature of the invention will be understood from the following specification and the accompanying drawings, in which:

FIG. 1 is a side elevational view of a hanger conveyor embodying my invention.

FIG. 2 is a fragmentary top plan view looking in the direction of line 2—2 on FIG. 1, certain parts being broken away to show details of construction.

FIG. 3 is an enlarged view, partly in vertical section and partly in side elevation, showing the receiving and discharging end portions of the conveyor of FIG. 1, the central portion of the mechanism being omitted.

FIG. 4 is an enlarged view, taken on line 4—4 of FIG. 2, and showing a preferred manner of supporting the conveyor.

FIG. 5 is an enlarged view, partly in section and partly in side elevation, showing a hinged gate which, for clarity, was omitted from FIG. 1, said gate being shown in open position.

FIG. 6 is a bottom plan view looking in the direction of line 6—6 on FIG. 5.

FIG. 7 is a side elevational view of the portion of the conveyor included in FIG. 6, but showing the gate in its closed position.

Referring now in greater detail to the various figures of the drawings wherein smiliar reference characters refer to similar parts, there is shown in FIG. 1 a conveyor 10 formed of upper guide 12 and a lower track 14. As illustrated in FIG. 1, the conveyor extends from a lower story of a building to an upper story thereof with an intermediate portion thereof inclined and passing through an aperture 15 in the partition 17 which forms the ceiling for the lower story and the floor for the upper story. It will be understood that the conveyor may also be used on one floor, and that it may be straight, or curved, or otherwise shaped.

As shown in FIG. 4, upper guide 12 has a longitudinal bore 16, and its underside is provided with a downwardly facing groove 18. Lower track 14 may be of any desired cross section and its upper side is provided with a groove 20. Grooves 18 and 20 co-act to form a channel which is hereinafter referred to.

At its opposite ends, upper guide 12 is provided with inclined extensions 22 and 24 which are arcuate in cross section and the undersides of which form continuations of the upper side of bore 16.

The conveyor also includes a flexible element such as cable 26 which fixedly carries spaced balls 28 and which is adapted to travel endlessly in bore 16 and in the channel formed by grooves 18 and 20. Cable 26 and balls 28 move from left to right above track 14, and from right to left in bore 16. At one end of the conveyor (the left end in this case) cable 26 rides over roller 30 which is driven by the shaft 32 of a prime mover 34. At the other end of the conveyor, cable 26 rides over idle return roller 36 which guides the cable into bore 16. It will be noted that the diameters of the bore 16 and of the channel formed by grooves 18 and 20 are greater than the diameter of balls 28 so that when cable 26 is stretched taut balls 28 do not scrape against the wall of bore 16 or against the underside of upper guide 12 or the upper side of lower track 14. In other words, the movement of cable 26 and balls 28 is substantially frictionless.

In order to permit installation of cable 26 and to permit stretching taut after it is installed, roller 36 is mounted on a shaft 38 which is journaled in a block 40, which is held by bracket 42 which is slidable on a base plate 44. Base plate 44 is provided with a fixed post 46 having a screw-threaded aperture for receiving adjustment screw 48, the point of which abuts the bracket 42. To loosen cable 26, screw 48 is backed off to permit block 40 to move to the left. To tighten cable 26, screw 48 is advanced to move block 40 to the right until the desired tension is achieved. As above noted, when cable 26 is stretched taut enough, balls 28 will move through bore 16 and in the channel formed by grooves 18 and 20, with little or no contact with the adjacent walls. As cable 26 leaves the roller 36, balls 28 travel against the underside of extension 24, which serves to guide the cable into proper position relative to bore 16. As the cable leaves bore 16, balls 28 move against the underside of extension 22, which guides the cable into proper position relative to roller 30.

Lower track 14 is adapted to support the hook of a garment hanger 54, or other object, and is provided with inclined extensions at either end, there being a downwardly inclined end receiving extension 50 and a discharge extension 52, both of which are positioned beyond the corresponding rollers 30 and 36. Receiving extension 50 extends beyond driving roller 30 and is adapted to receive the hook of a coat hanger 54, as at 55 in FIGS. 1 and 5, or in the path of an approaching ball 28.

As will be best understood from FIGS. 1 and 3, each ball 28 will, as it moves over track 14, push the hanger in front of it toward and down discharge extension 52. The hangers moving down discharge extension 52 are removed by an operator, or allowed to fall onto some rail or other conveyor, not shown, While for simplicity, only one hanger is shown between successive balls 28, it is within the scope of the invention to place more than one hanger, or other object, on receiving extension 56, or in the path of each approaching ball 28, so that each ball will propel more than one hanger. It is understood that the objects to be propelled slide on track 14 which for this purpose is made smooth, and which can be provided with antifriction devices if so desired.

The conveyor is mounted in position by any suitable means suspended from the ceiling or rising from the floor, it being only necessary that the side through which objects 54 are placed on, and removed from, track 14 be unobstructed. As illustrated, it is the right hand side of FIG. 4, or the side facing the viewer of FIG. 1. A preferred form of support 56, which is shown in FIG. 4, includes upper and lower C-clamps 58 and 60, which are provided with shoes 62 and 64 engaging upper guide 12 and lower track 14 in any suitable manner to hold the same in the spaced relation shown. C-clamp members are secured by split collars 66 and 68, which are clamped on upright 70.

In order to be able to divert hangers before they reach discharge extension 52, lower track 14 includes a separate section 80, which is hinged to track 14 as at 82, and which is movable to the open position of FIGS. 5 and 6 in which track 14 is interrupted to permit the hangers to fall as at 84, or to the position of FIGS. 1 and 7, in which section 80 joins the adjacent ends of track 14 to provide a continuous surface. Below section 80 any desired receiver, such as inclined bar 86, or another conveyor, can be placed to move the hangers to any desired destination.

The operation is as follows:

The coat hangers, or other objects, are placed singly, or in numbers, on the flat portion of the receiving extension 22 so as to be engaged by balls 28 successively leaving roller 30. If it is desired to send the hangers to a higher floor, the structure of FIG. 1 is used. If not, the conveyor is confined to one level in a linear, or non-linear configuration. If it is desired to divert the hangers into another path, gate 80 is opened, as shown in FIGS. 5 and 6, to let the hangers drop onto rail 86.

While the invention has been described as applied to the handling of clothes in a factory, it is obvious that objects other than garment hangers can be so handled.

While only one gate 80 has been shown, and while no special means for moving it to either of its positions is shown, it is nevertheless to be understood that any number of gates can be provided and that they can be automatically operated by remote control. Since remote control devices are now common knowledge, it is thought unnecessary to disclose any particular type in detail.

It is thought that, in addressing one skilled in the art, it is enough to suggest the use of solenoid which can be activated by remote switches.

What I claim is:

1. A conveyor comprising an upper guide having a bore therethrough, and having a groove formed in the underside thereof, a lower track having a groove formed in the upper surface thereof, said grooves co-acting to form a guide channel, a driven roller adjacent one end of said bore and said track, an idle roller adjacent the opposite end of said bore and said track, a cable traveling endlessly over said rollers whereby the upper flight of said cable passes through said bore and the lower flight thereof passes through said channel, longitudinally spaced balls mounted on said cable, and means for maintaining said cable in taut condition and centered relative to said bore and said channel, the diameter of said bore and the diameter of said channel being larger than the diameter of said balls, whereby said balls are moved through said bore and through said channel without contacting the wall of said bore or the surfaces which form said channel, the length of said guide being less than, and the length of said track being greater than the distance between said rollers.

2. The mechanism of claim 1 wherein said means for maintaining said cable in taut condition comprises a slidable block supporting one of said rollers and an adjustment screw operatively connected to said block.

3. The conveyor defined in claim 1 in which the opposite end portions of said guide are curved upwardly and their ends are substantially tangent to said idle and said driven roll whereby one end of said guide receives conveyor balls coming off one of said rolls and the other end of said guide delivers conveyor balls to the other of said rolls.

References Cited in the file of this patent

UNITED STATES PATENTS

| 2,946,427 | Friedman | July 26, 1960 |
| 2,987,170 | Hamilton | June 6, 1961 |

FOREIGN PATENTS

| 401,629 | Italy | July 25, 1943 |